United States Patent
Okayasu et al.

(10) Patent No.: US 12,500,503 B2
(45) Date of Patent: Dec. 16, 2025

(54) POWER CONDITIONER AND POWER CONVERSION SYSTEM

(71) Applicant: TMEIC Corporation, Tokyo (JP)

(72) Inventors: Masakazu Okayasu, Tokyo (JP); Haiqing Li, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 140 days.

(21) Appl. No.: 18/294,560

(22) PCT Filed: Jul. 28, 2022

(86) PCT No.: PCT/JP2022/029138
§ 371 (c)(1),
(2) Date: Feb. 2, 2024

(87) PCT Pub. No.: WO2024/024040
PCT Pub. Date: Feb. 1, 2024

(65) Prior Publication Data
US 2024/0339915 A1    Oct. 10, 2024

(51) Int. Cl.
*H02M 1/00* (2006.01)
*H02M 7/5387* (2007.01)

(52) U.S. Cl.
CPC ....... *H02M 1/0012* (2021.05); *H02M 1/0025* (2021.05); *H02M 7/53873* (2013.01)

(58) Field of Classification Search
CPC ............. H02M 1/0012; H02M 1/0025; H02M 7/53873
See application file for complete search history.

(56) References Cited

U.S. PATENT DOCUMENTS 12,416,935 B2 *   9/2025   Katsukura ............... H02J 3/381
12,418,055 B2 *   9/2025   Li ......................... H01M 10/48

FOREIGN PATENT DOCUMENTS

JP          2015-149840 A       8/2015

OTHER PUBLICATIONS

International Search Report & Written Opinion issued Oct. 18, 2022 in PCT/JP2022/029138, filed on Jul. 28, 2022, 11 pages (with English Translation).

* cited by examiner

*Primary Examiner* — Adolf D Berhane
(74) *Attorney, Agent, or Firm* — Oblon, McClelland, Maier & Neustadt, L.L.P.

(57) ABSTRACT

A PI controller that calculates a PI control value for charge limitation, which is a PI control value for a deviation between a DC voltage applied to an inverter circuit and a charge limiter operating voltage when the DC voltage is higher than the charge limiter operating voltage, and calculates a PI control value for discharge limitation, which is a PI control value for a deviation between the DC voltage and a discharge limiter operating voltage when the DC voltage is lower than the discharge limiter operating voltage. A limiter regulator increases a limitation on a charging power command value from a host device by a command value limiter in accordance with the PI control value for charge limitation and increases a limitation on a discharging power command value from the host device by the command value limiter in accordance with the PI control value for discharge limitation.

18 Claims, 10 Drawing Sheets

Fig. 2
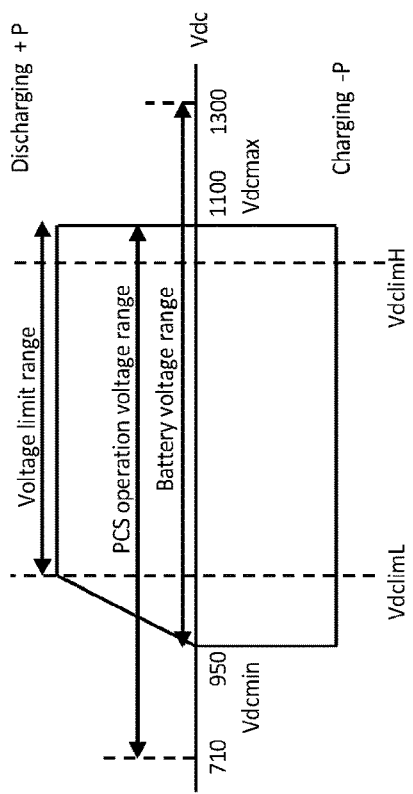
Example 2
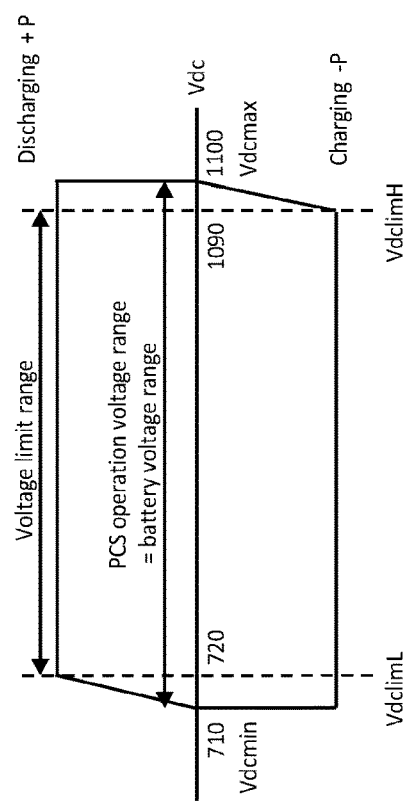
Example 1

Fig. 6
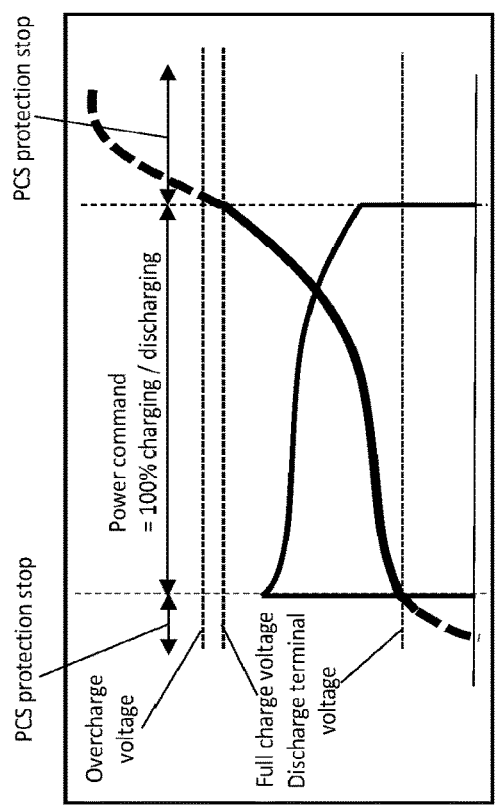
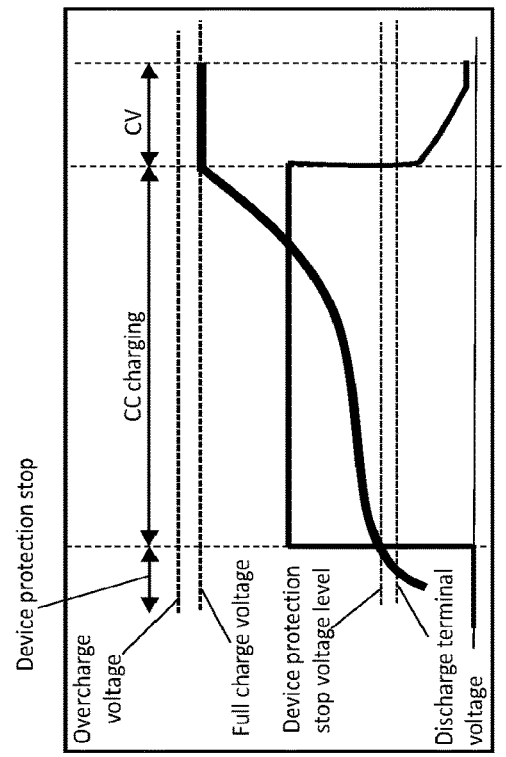

POWER CONDITIONER AND POWER CONVERSION SYSTEM

TECHNICAL FIELD

The present disclosure relates to a power conditioner and a power conversion system including the power conditioner.

BACKGROUND ART

There is known a technique in which a storage battery is connected to an AC power system via a power conditioner to suppress power fluctuation of the AC power system with the storage battery. By controlling a gate pulse input to an inverter circuit of the power conditioner, AC power of the AC power system can be converted to DC power and charged to the storage battery, or DC power of the storage battery can be converted back to AC power and discharged to the AC power system. In a conventional power conditioner, a gate pulse signal for driving the inverter circuit is controlled in accordance with a command from a host device. As the host device, for example, an energy management system (EMS) disclosed in JP2015-149840A is known.

PRIOR ART DOCUMENT

Patent Document

[Patent Document 1] JP2015-149840A

SUMMARY OF THE INVENTION

Problems to be Solved by the Invention

However, the power conditioner does not generally grasp operation information of the storage battery including a state of charge (SOC). Therefore, when the host device erroneously inputs a command to the power conditioner to overcharge the storage battery, the power conditioner operates in accordance with a charging power command value as it is, which may cause overcharge of the storage battery. Similarly, when the power conditioner is operated in accordance with the command value of the electric power that may cause over-discharge, which is commanded from the host device, the over-discharge of the storage battery may occur.

An object of the present disclosure is to provide a power conditioner capable of preventing at least one of overcharge and over-discharge of a storage battery with a simple configuration.

Solution to Problem

According to a first aspect of the present disclosure, a power conditioner includes an inverter circuit that connects an AC power system and a storage battery, a command value limiter, a drive signal generator, a PI controller, and a limiter regulator. According to the first aspect of the present disclosure, the command value limiter, the drive signal generator, the PI controller, and the limiter regulator are configured as follows.

The command value limiter is configured to limit a charging power command value commanded by a host device and a discharging power command value commanded by the host device. The drive signal generator is configured to generate a drive signal for the inverter circuit in accordance with the charging power command value limited by the command value limiter or the discharging power command value limited by the command value limiter. The PI controller is configured to calculate a PI control value for charge limitation, which is a PI control value for a deviation between a DC voltage applied to the inverter circuit and a preset charge limiter operating voltage, in response to the DC voltage being higher than the charge limiter operating voltage. The PI controller is also configured to calculate a PI control value for discharge limitation, which is a PI control value for a deviation between the DC voltage and a preset discharge limiter operating voltage, in response to the DC voltage being lower than the discharge limiter operating voltage. The limiter regulator is configured to increase a limitation on the charging power command value by the command value limiter in accordance with the PI control value for charge limitation. The limiter regulator is also configured to increase a limitation on the discharging power command value by the command value limiter in accordance with the PI control value for discharge limitation.

The command value limiter may be configured to multiply the charging power command value by a charge limitation gain having a value of 0 or more and 1 or less, and multiply the discharging power command value by a discharge limitation gain having a value of 0 or more and 1 or less. The limiter regulator may be configured to decrease the charge limitation gain in accordance with the PI control value for charge limitation and decrease the discharge limitation gain in accordance with the PI control value for discharge limitation. Further, the limiter regulator may be configured to maintain the charge limitation gain at 0 while the PI control value for charge limitation is out of a preset range. The limiter regulator may be configured to maintain the discharge limitation gain at 0 while the PI control value for discharge limitation is out of a preset range.

According to a second aspect of the present disclosure, a power conditioner includes an inverter circuit that connects an AC power system and a storage battery, a command value limiter, a drive signal generator, a PI controller, and a limiter regulator. According to the second aspect of the present disclosure, the command value limiter, the drive signal generator, the PI controller, and the limiter regulator are configured as follows.

The command value limiter is configured to limit a charging power command value commanded by a host device. The drive signal generator is configured to generate a drive signal for the inverter circuit in accordance with the charging power command value limited by the command value limiter. The PI controller is configured to calculate a PI control value for charge limitation, which is a PI control value for a deviation between a DC voltage applied to the inverter circuit and a preset charge limiter operating voltage, in response to the DC voltage being higher than the charge limiter operating voltage. The limiter regulator is configured to increase a limitation on the charging power command value by the command value limiter in accordance with the PI control value for charge limitation.

The command value limiter may be configured to multiply the charging power command value by a charge limitation gain having a value of 0 or more and 1 or less. The limiter regulator may be configured to decrease the charge limitation gain in accordance with the PI control value. Further, the limiter regulator may be configured to maintain the charge limitation gain at 0 while the PI control value for charge limitation is out of a preset range.

According to a third aspect of the present disclosure, a power conditioner includes an inverter circuit that connects an AC power system and a storage battery, a command value limiter, a drive signal generator, a PI controller, and a limiter regulator. According to the third aspect of the present disclosure, the command value limiter, the drive signal generator, the PI controller, and the limiter regulator are configured as follows.

The command value limiter is configured to limit a discharging power command value commanded by a host device. The drive signal generator is configured to generate a drive signal for the inverter circuit in accordance with the discharging power command value limited by the command value limiter. The PI controller is configured to calculate a PI control value for discharge limitation, which is a PI control value for a deviation between a DC voltage applied to the inverter circuit and a preset discharge limiter operating voltage, in response to the DC voltage being lower than the discharge limiter operating voltage. The limiter regulator is configured to increase a limitation on the discharging power command value by the command value limiter in accordance with the PI control value.

The command value limiter may be configured to multiply the discharging power command value by a discharge limitation gain having a value of 0 or more and 1 or less. The limiter regulator may be configured to decrease the discharge limitation gain in accordance with the PI control value for discharge limitation. Further, the limiter regulator may be configured to maintain the discharge limitation gain at 0 while the PI control value for discharge limitation is out of a preset range.

The present disclosure also provides a power conversion system. According to one aspect of the present disclosure, a power conversion system includes one or more power conditioners connected to a common AC power system and a host device configured to command a charging power command value or a discharging power command value to the one or more power conditioners. The one or more power conditioners are the power conditioners according to any one of the first to third aspects of the present disclosure.

Effects of the Invention

According to the present disclosure, it is possible to prevent at least one of overcharge and over-discharge of the storage battery with a simple configuration. In particular, by strengthening the limitation on the charging power command value by the command value limiter in accordance with the PI control value for the deviation between the DC voltage and the charge limiter operating voltage, chattering of the command value limiter caused by voltage fluctuations is suppressed so as to continue the charging operation as much as possible. In addition, by strengthening the limitation on the discharging power command value by the command value limiter in accordance with the PI control value for the deviation between the DC voltage and the discharge limiter operating voltage, chattering of the command value limiter caused by voltage fluctuation is suppressed so as to continue the discharging operation as much as possible.

BRIEF DESCRIPTION OF DRAWINGS

FIG. 2 is a diagram illustrating a relationship between a charge limiter operating voltage value and a discharge limiter operating voltage value, and a voltage range of a power conditioner and a voltage range of a storage battery.

FIG. 6 is a diagram showing an example of changes in voltage and current during a general charging operation of a storage battery and an example of changes in voltage and current during charging and discharging by a conventional power conditioner.

DETAILED DESCRIPTION OF THE INVENTION

1. Configuration of Power Conditioner

Hereinafter, a power conditioner according to an embodiment of the present disclosure will be described with reference to the drawings. The power conditioner is also called a power conditioning system, and is generally abbreviated as PCS. Also in this specification, the power conditioner is abbreviated as PCS.

Figure 1:
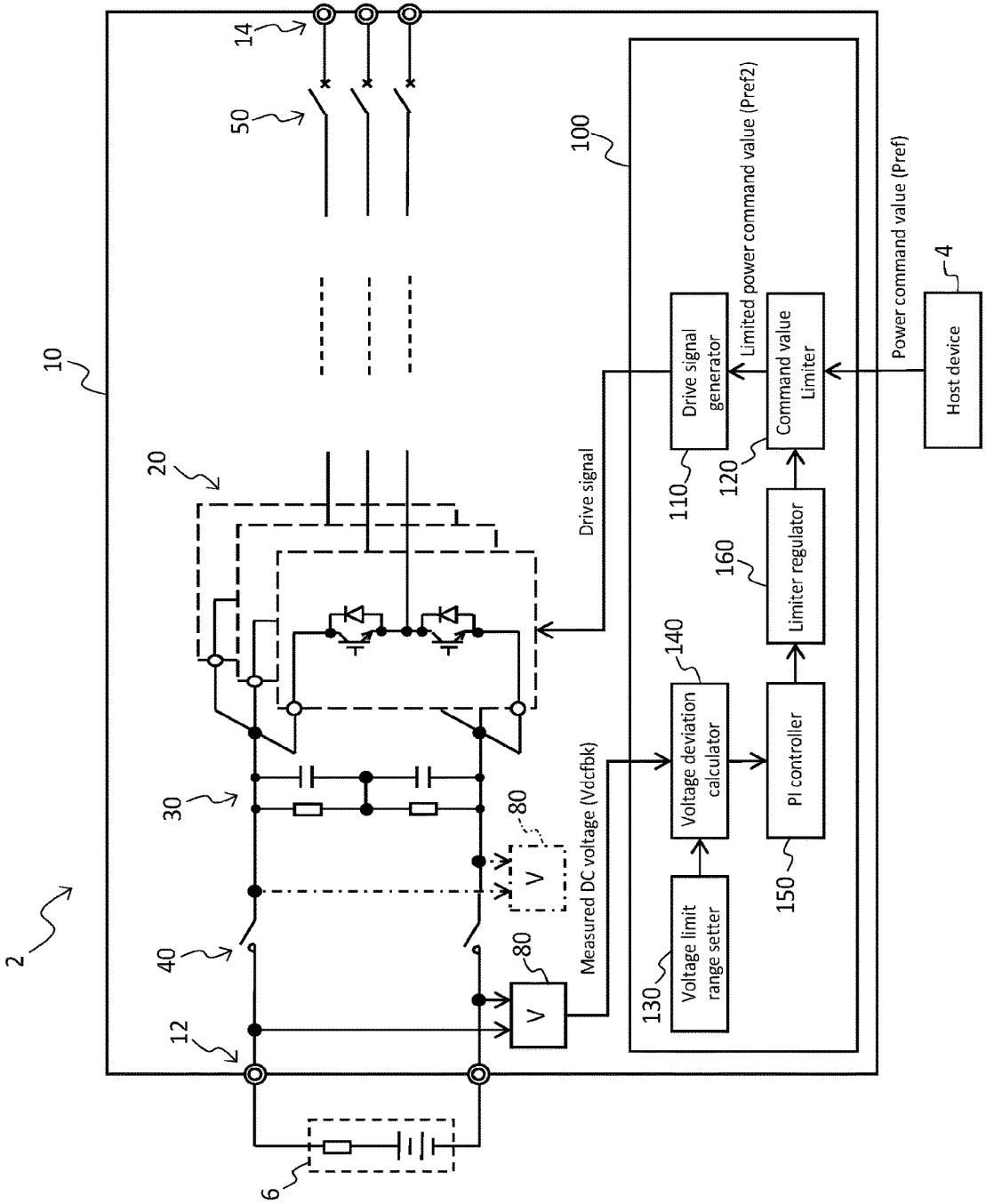
FIG. 1 is a diagram illustrating the configuration of a power conditioner according to an embodiment of the present disclosure and the configuration of a power conversion system using the power conditioner.

FIG. 1 is a diagram illustrating the configuration of a PCS 10 according to the embodiment of the present disclosure and the configuration of a power conversion system 2 using the PCS 10. The power conversion system 2 is a distributed power supply system for grid-connected applications that combines a host device 4 and a single or multiple PCSs 10. In the example shown in FIG. 1, only one PCS 10 is shown for convenience. A storage battery 6 is connected to each PCS 10. The host device 4 is a controller that instructs each PCS 10 constituting the power conversion system 2 to perform charging or discharging. An example of the host device 4 may be an EMS.

The PCS 10 includes a system connection terminal 14 to which a three-phase AC power system (not shown) is connected, and a DC power supply connection terminal 12 to which the storage battery 6 is connected. Inside the PCS 10, a three-phase inverter circuit 20 is provided which converts AC power of the AC power system to DC power and converts back DC power of the storage battery 6 to three-phase AC power. The AC power system may be a single-phase system. In this case, a single-phase inverter circuit is provided inside the PCS 10.

A smoothing circuit 30 for smoothing a DC current is provided between the DC power supply connection terminal 12 and the inverter circuit 20. The smoothing circuit is composed of a resistor and a capacitor. Between the DC power supply connection terminal 12 and the smoothing circuit 30, a DC current breaker 40 is provided for interrupting a DC current. In addition, an AC current breaker 50 that interrupts a three-phase AC current is provided between the system connection terminal 14 and the inverter circuit 20.

A voltmeter 80 is provided in the PCS 10. The voltmeter 80 measures a DC input voltage generated between the positive electrode and the negative electrode of the DC power supply connection terminal 12. Alternatively, the voltmeter 80 may be installed between the smoothing circuit 30 and the DC current breaker 40 to measure the DC capacitor voltage of the smoothing circuit 30. The DC voltage measured by the voltmeter 80 is input to a controller 100 to be described next.

The controller 100 is provided in the PCS 10. The controller 100 controls a charging operation and a discharging operation of the PCS 10. A command from the host device 4 is input to the controller 100. The command input from the host device 4 to the controller 100 includes an active power command value of discharge power for discharging power from the storage battery 6 to the AC power system (hereinafter referred to as a discharging power command value) and an active power command value of charge power for charging power from the AC power system to the storage battery 6 (hereinafter referred to as a charging power command value). The discharging power command value is a power command value taking a value within a range of 0 to 100%. The charging power command value is a power command value taking a value within a range of −100 to 0%.

The controller 100 may be an application specific integrated circuit (ASIC), a field programmable gate array (FPGA), a central processing unit (CPU), or another device. Alternatively, the controller 100 may be a combination of two or more ASICs, FPGAs, CPUs, or other devices. The ASIC, FPGA, CPU and other device corresponding to the controller 100 include a series of executable instructions. When the instructions are executed, the corresponding ASIC, FPGA, CPU, and other devices are triggered to perform the functions described below. The instructions may be stored in a storage medium or embedded in a corresponding ASIC or FPGA.

In FIG. 1, functions of the controller 100 are represented by blocks. The controller 100 includes a drive signal generator 110, a command value limiter 120, a voltage limit range setter 130, a voltage deviation calculator 140, a PI controller 150, and a limiter regulator 160. These are functions performed in a corresponding ASIC, FPGA, CPU or other device by execution of a sequence of instructions.

The drive signal generator 110 includes a gate pulse generation circuit that drives the switching elements of the inverter circuit 20. The drive signal generator 110 receives an input of the power command value and generates a gate pulse signal so that the output power of the inverter circuit 20 matches the power command value. When the input power command value is the charging power command value, the drive signal generator 110 generates a gate pulse signal for driving the inverter circuit 20 so that charge from the AC power system to the storage battery 6 is performed. When the input power command value is the discharging power command value, the drive signal generator 110 generates a gate pulse signal for driving the inverter circuit 20 so that discharge from the storage battery 6 to the AC power system is performed.

The command value limiter 120 limits the power command value input from the host device 4 to the drive signal generator 110. The power command value input to the drive signal generator 110 is a power command value limited by the command value limiter 120. When the power command value is a charging power command value having a negative value, limiting the power command value means correcting the power command value to a command value having a higher value (a command value closer to 0). As a specific example, the command value limiter 120 multiplies the charging power command value by a charge limitation gain having a value of 0 or more and 1 or less. The limitation on the charging power command value by the command value limiter 120 is automatically regulated by the limiter regulator 160 described later.

When the command from the host device 4 to the PCS 10 is a discharge command, the power command value input to the drive signal generator 110 takes a positive value. When the power command value is a discharging power command value having a positive value, limiting the power command value means correcting the power command value to a command value having a lower value (a command value closer to 0). As a specific example, the command value limiter 120 multiplies the discharging power command value by a discharge limitation gain having a value of 0 or more and 1 or less. The limitation on the discharging power command value by the command value limiter 120 is also automatically regulated by the limiter regulator 160 described later.

The voltage limit range setter 130 stores a preset charge limiter operating voltage and a preset discharge limiter operating voltage. The charge limiter operating voltage is a voltage that triggers the overcharge prevention operation of the PCS 10. The discharge limiter operating voltage is a voltage that triggers the over-discharge prevention operation of the PCS 10. The concept of setting the charge limiter operating voltage and the discharge limiter operating voltage will be described later.

The voltage deviation calculator 140 reads the charge limiter operating voltage and the discharge limiter operating voltage from the voltage limit range setter 130. Further, the voltage deviation calculator 140 acquires the DC voltage measured by the voltmeter 80 at a constant period. The voltage deviation calculator 140 compares the measured DC voltage with the charge limiter operating voltage and compares the measured DC voltage with the discharge limiter operating voltage each time the measured DC is acquired from the voltmeter 80. However, the measured DC voltage used for the comparison is not an instantaneous value but a moving average value in a preset period.

When the measured DC voltage is higher than the charge limiter operating voltage, the voltage deviation calculator 140 outputs a deviation of the measured DC voltage with respect to the charge limiter operating voltage. When the measured DC voltage is lower than the discharge limiter operating voltage, the voltage deviation calculator 140 outputs a deviation of the measured DC voltage with respect to the discharge limiter operating voltage. When the measured DC voltage is equal to or lower than the charge limiter operating voltage and equal to or higher than the discharge limiter operating voltage, the voltage deviation calculator 140 sets the output value to 0.

The output of the voltage deviation calculator 140 is input to the PI controller 150. The PI controller 150 calculates a PI control value for the output of the voltage deviation calculator 140. More specifically, the PI controller 150 calculates a PI control value for a deviation between the charge limiter operating voltage and the measured DC voltage and a PI control value for a deviation between the discharge limiter operating voltage and the measured DC voltage. The former is a PI control value calculated when the measured DC voltage is higher than the charge limiter operating voltage, and is used to limit charging. The latter is a PI control value calculated when the measured DC voltage is lower than the discharge limiter operating voltage, and is used for discharge limitation. The calculation formula for calculating the PI control value for charge limitation and the calculation formula for calculating the PI control value for discharge limitation are defined separately.

The PI control value for charge limitation and the PI control value for discharge limitation calculated by the PI controller 150 are input to the limiter regulator 160. The limiter regulator 160 strengthens the limitation on the charging power command value by the command value limiter 120 according to the PI control value for charge limitation. When a deviation occurs between the measured DC voltage and the charge limiter operating voltage, the PI control value for charge limitation changes in one direction of the positive side or the negative side. Whether to change to the positive side or the negative side depends on the setting of the proportional gain of the PI control.

Until the PI control value for charge limitation changes from the initial value to a preset threshold value, the limiter regulator 160 linearly increases the limitation by the command value limiter 120 with respect to the change in the PI control value for charge limitation. As a specific example, the limiter regulator 160 causes the charge limitation gain to approach 0 from 1 as the PI control value for charge limitation approaches the threshold value. Then, the limiter regulator 160 sets the charge limitation gain to 0 when the PI control value for charge limitation reaches the threshold value, and maintains the charge limitation gain at 0 while the PI control value for charge limitation is out of the preset range defined by the threshold value.

In addition, the limiter regulator 160 strengthens the limitation on the discharging power command value by the command value limiter 120 according to the PI control value for discharge limitation. When a deviation occurs between the measured DC voltage and the discharge limiter operating voltage, the PI control value for discharge limitation changes in one direction of the positive side or the negative side. Whether to change to the positive side or the negative side depends on the setting of the proportional gain of the PI control.

Until the PI control value for discharge limitation changes from the initial value to a preset threshold value, the limiter regulator 160 linearly increases the limitation by the command value limiter 120 with respect to the change in the PI control value for discharge limitation. As a specific example, the limiter regulator 160 causes the discharge limitation gain to approach 0 from 1 as the PI control value for discharge limitation approaches the threshold value. Then, the limiter regulator 160 sets the discharge limitation gain to 0 when the PI control value for discharge limitation reaches the threshold value, and maintains the discharge limitation gain at 0 while the PI control value for discharge limitation is out of the preset range defined by the threshold value.

2. Operation of Power Conditioner

Next, an operation of the PCS 10 configured as described above, in particular, an operation of the controller 100 will be described.

First, before describing the operation of the controller 100, the charge limiter operating voltage and the discharge limiter operating voltage set by the voltage limit range setter 130 will be described. The charge limiter operating voltage and the discharge limiter operating voltage are set in consideration of the operation voltage range of the PCS 10 and the voltage range of the storage battery 6. FIG. 2 is a diagram illustrating the relationship between the charge limiter operating voltage value VdclimL and the discharge limiter operating voltage value VdclimH, and the operation voltage range of the PCS 10 and the voltage range of the storage battery 6.

As shown in Example 1 of FIG. 2, the operation voltage range of the PCS 10 is generally matched to the voltage range of the storage battery 6. In this case, the lower limit operation voltage of the PCS 10 coincides with the lower limit voltage of the storage battery 6 and is set as the system lower limit voltage Vdcmin. The discharge limiter operating voltage value VdclimL is set to a voltage higher than the system lower limit voltage Vdcmin. For example, when the system lower limit voltage Vdcmin is 710V, the discharge limiter operating voltage value VdclimL is set to 720V. Further, the upper limit operation voltage of the PCS 10 coincides with the upper limit voltage of the storage battery 6 and is set as the system upper limit voltage Vdcmax. The charge limiter operating voltage value VdclimH is set to a voltage lower than the system upper limit voltage Vdcmax. For example, when the system upper limit voltage Vdcmax is 1100V, the charge limiter operating voltage value VdclimH is set to 1090V.

Further, as shown in Example 2 of FIG. 2, there is a case where a deviation occurs between the operation voltage range of the PCS 10 and the voltage range of the storage battery 6. In this case, the higher one of the lower limit operation voltage of the PCS 10 and the lower limit voltage of the storage battery 6 is set as the system lower limit voltage Vdcmin. The lower one of the upper limit operation voltage of the PCS 10 and the upper limit voltage of the storage battery 6 is set as the system upper limit voltage Vdcmax. For example, when the operation voltage range of the PCS 10 is 710 to 1100V and the voltage range of the storage battery 6 is 950 to 1300V, the system lower limit voltage Vdcmin is set to 950V and the system upper limit voltage Vdcmax is set to 1100V. The charge limiter operating voltage value VdclimL is set to a voltage higher than the system lower limit voltage Vdcmin. The discharge limiter operating voltage value VdclimH is set to a voltage lower than the system upper limit voltage Vdcmax. However, since the upper limit operation voltage of the PCS 10 is lower than the upper limit voltage of the storage battery 6, the storage battery 6 is not overcharged even in the vicinity of the upper limit operation voltage of the PCS 10. Therefore, in the case of Example 2, it is not necessary to limit the output within the range from the discharge limiter operating voltage value VdclimH to the system upper limit voltage Vdcmax.

Figure 3:
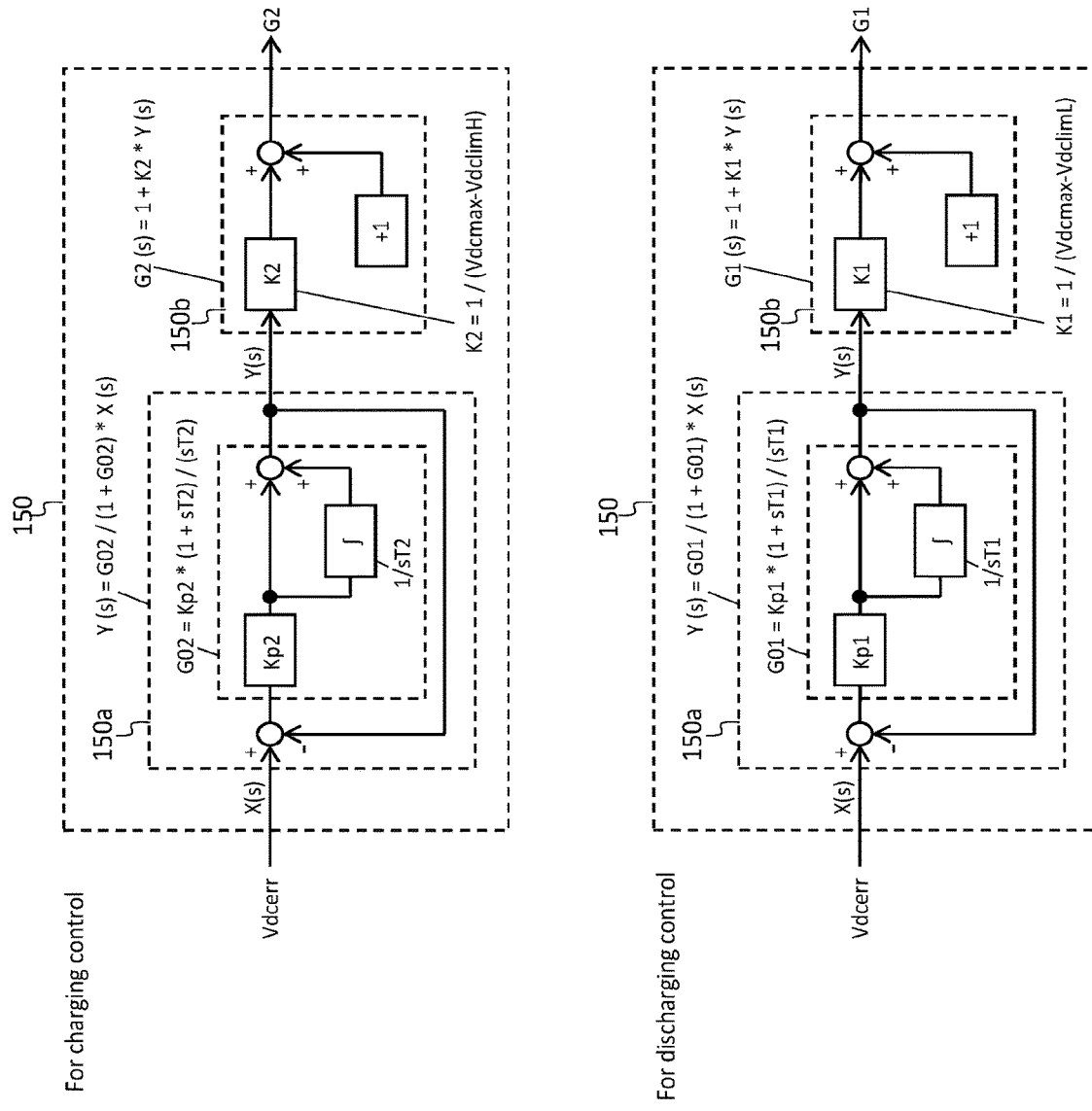
FIG. 3 is a diagram illustrating an example of the configuration of a PI controller according to the embodiment of the present disclosure.

One factor that determines the operation of the PCS 10 is the PI controller 150. The PI controller 150 is configured to perform different operations during charging and during discharging. FIG. 3 is a diagram illustrating an example of the configuration of the PI controller 150. The configuration of the PI controller 150 shown in the upper part of FIG. 3 is the configuration of the charge control PI controller 150 used during charging. The configuration of the PI controller 150 shown in the lower part of FIG. 3 is the configuration of the discharge control PI controller 150 used during discharging. The PI controller 150 includes a feedback controller 150a and a limiter converter 150b. However, the feedback controller 150a having different configurations are used for charging control and discharging control. Further, the limiter converter 150b having different configurations are used for charging control and discharging control.

First, a configuration for charging control will be described. The feedback controller 150a for charging control includes a proportional integrator having a transfer function G02 represented by the following equation (1). In the following equation (1), Kp2 is a proportional gain for charging control, and T2 is a time constant for charging control.

[Equation 1]

$$G02 = Kp2 * (1 + sT2)/sT2 \qquad (1)$$

When the above-described transfer function G02 is used, an equation for obtaining an output Y(s) of the feedback controller 150a for charging control is represented by the following equation (2). The feedback controller 150a causes the outputs Y(s) to follow the inputs X(s) as target values. However, the input X(s) in the following equation (2) is a deviation Vdcerr between the measured DC voltage Vdcfbk and the charge limiter operating voltage value VdclimH.

[Equation 2]

$$Y(s) = G02/(1 + G02) * X(s) \qquad (2)$$

The limiter converter 150b for charging control converts the output of the feedback controller 150a into a PI control value G2 for charge limitation. For this conversion, a charge limiter gain K2 expressed by the following equation (3) is used. By proportional control with the charge limiter gain K2, the output of the feedback controller 150a is converted from a voltage to a dimensionless quantity.

[Equation 3]

$$K2 = 1/(Vdcmax - VdclimH) \qquad (3)$$

When the charge limiter gain K2 is used, an equation for obtaining the PI control value G2 for charge limitation is represented by the following equation (4).

[Equation 4]

$$G2(s) = 1 + K2 * Y(s) \qquad (4)$$

Next, a configuration for discharging control will be described. The feedback controller 150a for discharging control includes a proportional integrator having a transfer function G01 represented by the following equation (5). In the following equation (5), Kp1 is a proportional gain for discharging control, and T1 is a time constant for discharging control. The proportional gain Kp1 may be the same value as the proportional gain Kp2 for charging control, or may be set to a different value. The time constant T1 may be set to the same value as the time constant T2 for charging control or may be set to a different value.

[Equation 5]

$$G01 = Kp1 * (1 + sT1)/sT1 \qquad (5)$$

When the transfer function G01 is used, an equation for obtaining an output Y(s) of the feedback controller 150a for discharging control is represented by the following equation (6). The feedback controller 150a makes the output Y(s) follow an input X(s) with the input X(s) as a target value. However, the input X(s) in the following equation (6) is a deviation Vdcerr between the measured DC voltage Vdcfbk and the discharge limiter operating voltage value VdclimL.

[Equation 6]

$$Y(s) = G01/(1 + G01) * X(s) \qquad (6)$$

The limiter converter 150b for discharging control converts the output of the feedback controller 150a into a PI control value G1 for discharge limitation. For this conversion, a discharge limiter gain K1 expressed by the following equation (7) is used. By proportional control using the discharge limiter gain K1, the output of the feedback controller 150a is converted from a voltage to a dimensionless quantity.

[Equation 7]

$$K1 = 1/(Vdcmin - VdclimL) \qquad (7)$$

When the discharge limiter gain K1 is used, an equation for obtaining the PI control value G1 for discharge limitation is represented by the following equation (8).

[Equation 8]

$$G1(s) = 1 + K1 * Y(s) \qquad (8)$$

Figure 4:
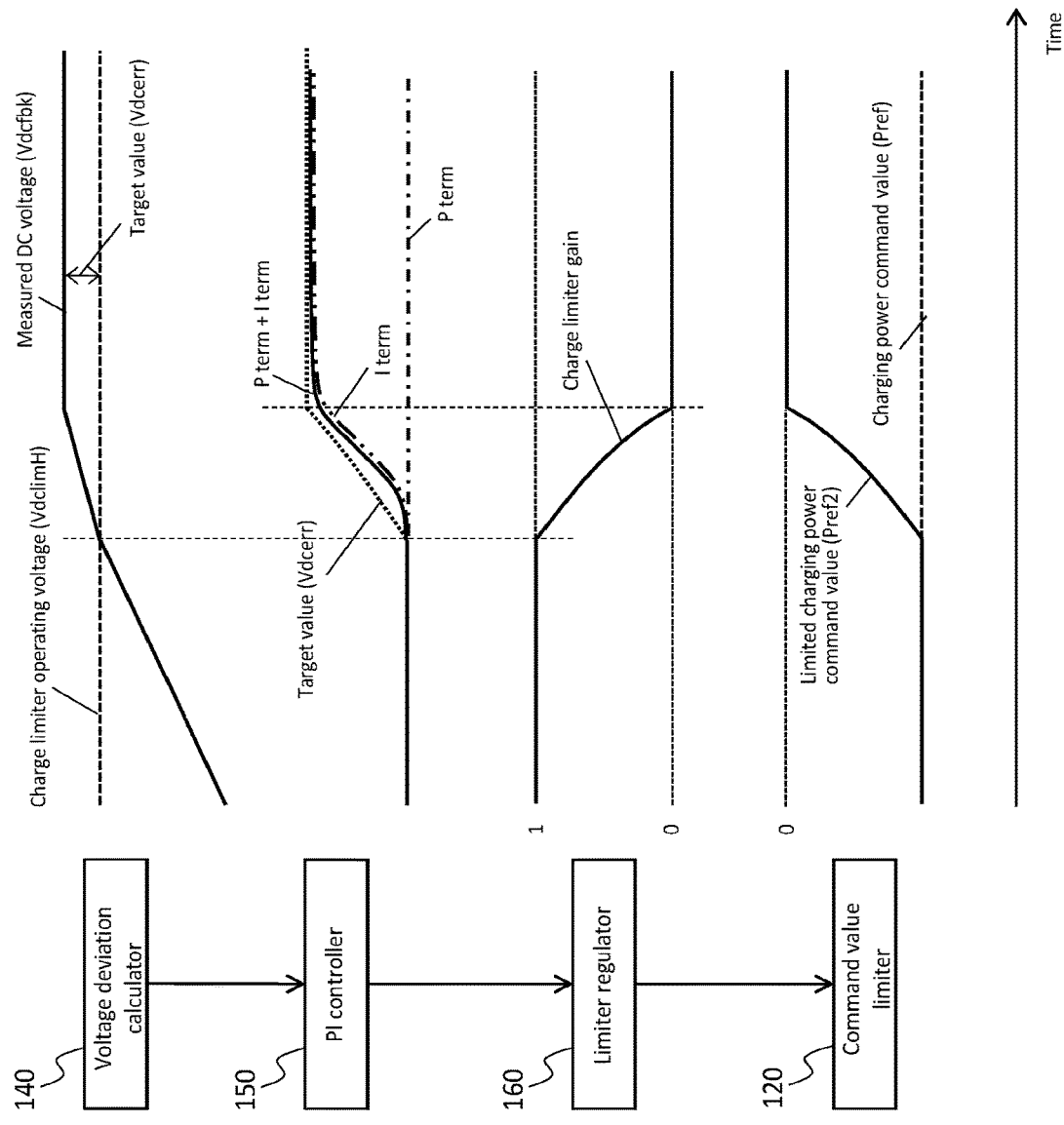
FIG. 4 is a diagram illustrating an overcharge prevention operation of the power conditioner according to the embodiment of the present disclosure.

The operation of the PCS 10 includes an overcharge prevention operation for protecting the storage battery 6 from overcharge. A specific example of the overcharge prevention operation of the PCS 10 is shown in FIG. 4. When a charging command is input from the host device 4 to the controller 100, the voltage deviation calculator 140 calculates the deviation Vdcerr between the measured DC voltage Vdcfbk and the charge limiter operating voltage value VdclimH. The PI controller 150 performs feedback control based on the deviation Vdcerr calculated by the voltage deviation calculator 140. When the sum of the P term and the I term of the feedback control converges to the deviation Vdcerr which is the target value, the PI control value G2 for charge limitation converges to a value represented by the following equation (9).

[Equation 9]

$$G2 = 1 + Vdcerr/(Vdcmax - VdclimH) \qquad (9)$$

The limiter regulator 160 reduces the charge limitation gain from 1 to 0 in accordance with a change in the PI control value G2 for charge limitation. Then, the command value limiter 120 limits the charging power command value Pref input from the host device 4 by the charge limitation gain adjusted by the limiter regulator 160, and inputs the limited charging power command value Pref2 to the drive signal generator 110. When the charge limitation gain is 1, the charging power command value Pref becomes the charging power command value Pref2 as it is, and when the charge limitation gain is 0, the charging power command value Pref2 becomes 0.

Figure 5:
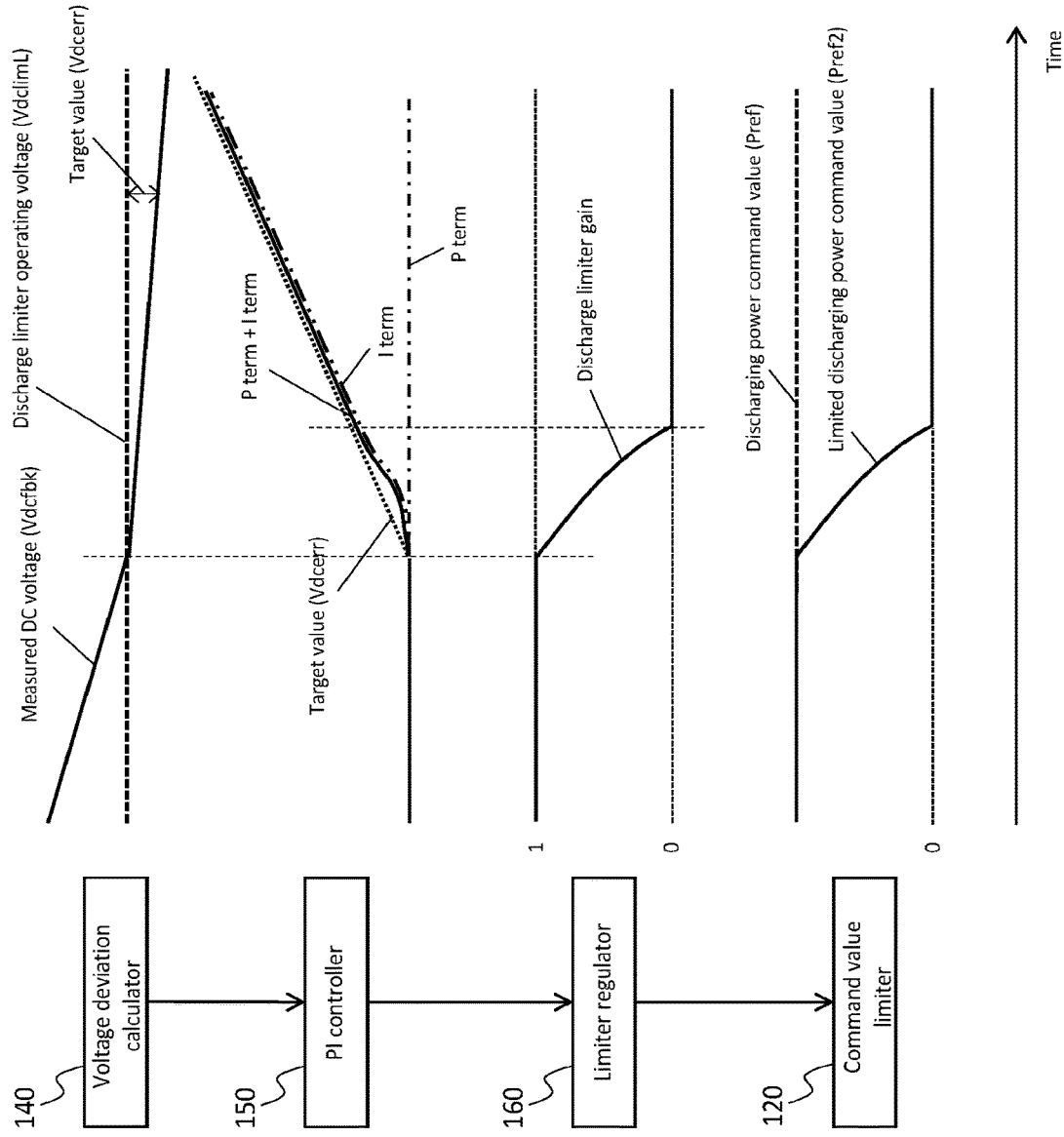
FIG. 5 is a diagram illustrating an over-discharge prevention operation of the power conditioner according to the embodiment of the present disclosure.

The operation of the PCS 10 includes an over-discharge prevention operation for protecting the storage battery 6 from over-discharge. A specific example of the over-discharge prevention operation of the PCS 10 is shown in FIG. 5. When a discharge command is input from the host device 4 to the controller 100, the voltage deviation calculator 140 calculates the deviation Vdcerr between the measured DC voltage Vdcfbk and the discharge limiter operating voltage value VdclimL. The PI controller 150 performs feedback control based on the deviation Vdcerr calculated by the voltage deviation calculator 140. When the sum of the P term and the I term of the feedback control converges to the deviation Vdcerr which is the target value, the PI control value G1 for discharge limitation converges to a value represented by the following equation (10).

[Equation 10]

$$G1 = 1 + Vdcerr/(Vdcmin - VdclimL) \qquad (10)$$

The limiter regulator 160 reduces the discharge limitation gain from 1 to 0 in accordance with a change in the PI control value G1 for discharge limitation. Then, the command value limiter 120 limits the discharging power command value Pref input from the host device 4 by the discharge limitation gain adjusted by the limiter regulator 160, and inputs the limited discharging power command value Pref2 to the drive signal generator 110. When the discharge limitation gain is 1, the discharging power command value Pref becomes the discharging power command value Pref2 as it is, and when the discharge limitation gain is 0, the discharging power command value Pref2 becomes 0.

As described above, in the overcharge prevention operation and the over-discharge prevention operation performed by the controller 100, the charge limitation gain and the discharge limitation gain are calculated based on the PI control value calculated using the proportional-integral control instead of the simple proportional control. If only the proportional control is used instead of the proportional-integral control, the DC voltage may fluctuate due to the influence of the fluctuation in the voltage of the storage battery 6 or the DC ripple caused by the switching of the inverter circuit 20, and the charge limitation gain or the discharge limitation gain of the command value limiter 120 may fluctuate sharply. For example, when 100% discharging operation is suddenly performed at the discharge terminal voltage, the DC voltage decreases. When the command value limiter 120 operates in response to the decrease in the DC voltage, the DC voltage increases again. In the case of simple proportional control, chattering may occur in such a manner. However, when the charge limitation gain and the discharge limitation gain are calculated using the PI control value obtained by the proportional-integral control, chattering does not occur because of the time constant in the control response, and smooth control is possible.

In addition, by using the PI control systems separately defined for the overcharge prevention operation and the over-discharge prevention operation, it is possible to realize the operation of the command value limiter 120 in accordance with the charge characteristic and the discharge characteristic of the storage battery 6. For example, since the voltage drop is steep in an over-discharge region as a characteristic of the storage battery 6, the PI control system for discharge limitation may be designed so that the over-discharge prevention operation of the command value limiter 120 is also performed quickly. To be more specific, by shortening the time constant T1 of the I term in the calculation formula of the PI control value G1 for discharge limitation, the over-discharge prevention operation of the command value limiter 120 can be quickened. Further, since the voltage fluctuation is gentle in an overcharge region, the PI control system for charge limitation may be designed so that the overcharge prevention operation of the command value limiter 120 is also gentle. To be more specific, by lengthening the time constant T2 of the I term in the calculation formula of the PI control value G2 for charge limitation, the overcharge prevention operation of the command value limiter 120 can be slowed down.

Here, the characteristics of the operation of the PCS 10 according to the present embodiment will be described in comparison with a conventional technique. FIG. 6 shows an example of changes in voltage and current according to a general charging operation mode of a storage battery. A thick line indicates voltage and a thin line indicates current. The general charging operation mode is a combination of a constant voltage operation (CV operation) and a constant current operation (CC operation) with direct current. More specifically, the CC operation is performed from the initial stage to the intermediate stage of the discharging operation and the charging operation. Then, the CC operation is switched to the CV operation in the vicinity of a full charge voltage, and full charge is performed without overcharging. Since the CV operation is continued even after the full charge, the current for self-discharge compensation of the battery is continued to flow in principle. However, the general charging operation mode does not have a special function of preventing over-discharge of the storage battery. In the general charging operation mode, the device is only protectively shut down when the voltage drops to a protective shut down voltage level of the device.

FIG. 6 also shows an example of changes in voltage and current during charging and discharging by a conventional PCS. A thick line indicates voltage and a thin line indicates current. The conventional PCS charges or discharges a storage battery in accordance with a power command value from a host device. Therefore, if the current command value is abnormal, the storage battery may be overcharged or over-discharged. In the conventional PCS, when the voltage rises to an overcharge voltage level, the PCS is stopped to protect the PCS from overcharge, and when the voltage reaches a discharge voltage level, the PCS is stopped to protect the PCS from over-discharge.

Figure 7:
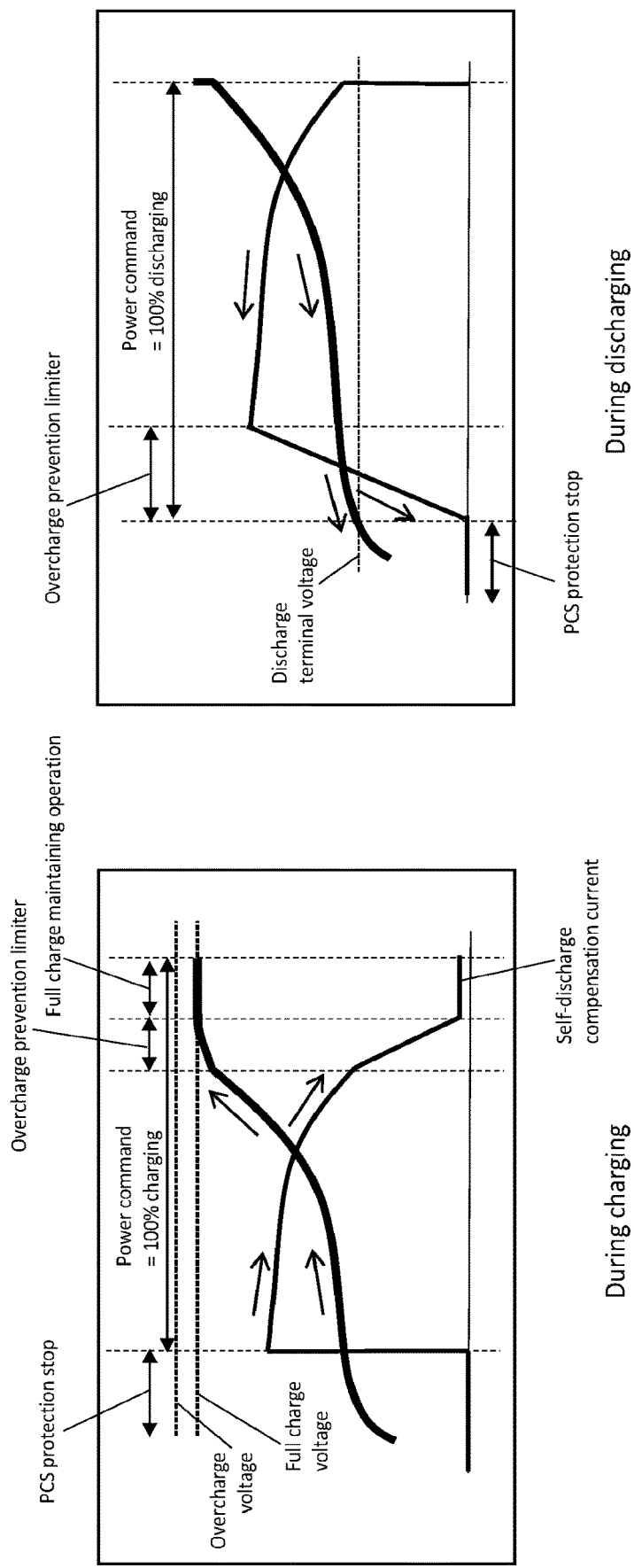
FIG. 7 is a diagram showing an example of the behavior of voltage and current during charging and an example of the behavior of voltage and current during discharging by the power conditioner according to the embodiment of the present disclosure.

In contrast to the conventional technique described above, changes in voltage and current during charging by the PCS 10 according to the present embodiment is shown in FIG. 7. According to the PCS 10, when the voltage rises due to charging, the function of the overcharge prevention operation allows the voltage to gradually reach the full charge voltage while monotonically decreasing the current. This prevents the voltage from overshooting the overcharge voltage level. And, this keeps the voltage at the full-charge voltage after the voltage reaches the full charge voltage.

Further, if the command value limiter 120 is not completely reduced to 0% but is reduced to several % during that time, the current for self-discharge compensation continues to flow to the storage battery 6.

FIG. 7 also illustrates changes in voltage and current during discharging by the PCS 10 according to the present embodiment. According to the PCS 10, when the voltage decreases due to discharging, the over-discharge prevention operation functions to allow the voltage to gradually reach a discharge termination voltage while monotonically decreasing the current. As a result, a steep voltage drop in the over-discharge region is prevented and the storage battery 6 is protected from over-discharge.

3. Specific Example of Configuration of Power Conditioner Controller

Next, a specific example of the configuration of the controller 100 will be described with reference to the drawings. Functions common among the specific examples are denoted by common reference numerals, and description of the functions is omitted or simplified.

FIRST SPECIFIC EXAMPLE

Figure 8:
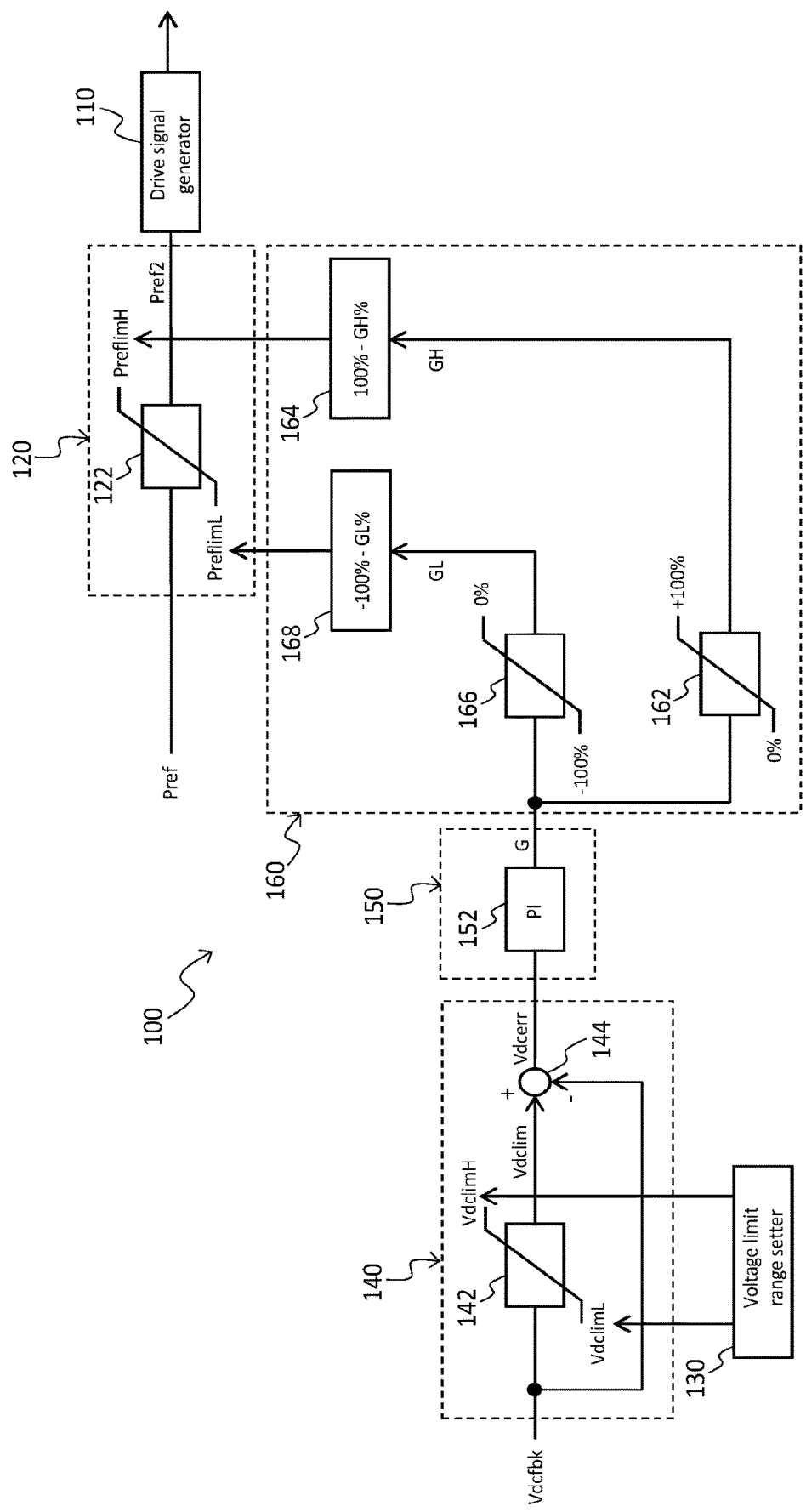
FIG. 8 is a diagram illustrating a first specific example of the configuration of a controller of the power conditioner according to the embodiment of the present disclosure.

FIG. 8 is a diagram illustrating a first specific example of the configuration of the controller 100. In the first specific example, the command value limiter 120 includes a variable limiter 122. The variable limiter 122 limits the positive power command value Pref, i.e., the discharging power command value to the upper limit value PreflimH. The upper limit value PreflimH is expressed as a percentage with respect to the power command value Pref, which is 100%. When the power command value Pref is a positive value, the variable limiter 122 outputs the upper limit value PreflimH as the limited power command value Pref2.

The variable limiter 122 limits the negative power command value Pref, i.e., the charging power command value to the lower limit value PreflimL. The lower limit value PreflimL is expressed as a percentage with respect to the power command value Pref, which is -100%. When the power command value Pref is a negative value, the variable limiter 122 outputs the lower limit value PreflimL as the limited power command value Pref2.

In the first specific example, the voltage deviation calculator 140 includes a limiter 142 and a subtractor 144. When the measured DC voltage Vdcfbk is a positive value, the limiter 142 compares the charge limiter operating voltage value VdclimH set by the voltage limit range setter 130 with the measured DC voltage Vdcfbk. If the measured DC voltage Vdcfbk is less than the charge limiter operating voltage value VdclimH, the limiter 142 outputs the measured DC voltage Vdcfbk as it is as the limited measured DC voltage Vdclim. If the measured DC voltage Vdcfbk is equal to or higher than the charge limiter operating voltage value VdclimH, the limiter 142 outputs the charge limiter operating voltage value VdclimH as the limited measured DC voltage Vdclim.

When the measured DC voltage Vdcfbk is a negative value, the limiter 142 compares the discharge limiter operating voltage value VdclimL set by the voltage limit range setter 130 with the measured DC voltage Vdcfbk. If the measured DC voltage Vdcfbk is higher than the discharge limiter operating voltage value VdclimL, the limiter 142 outputs the measured DC voltage Vdcfbk as it is as the limited measured DC voltage Vdclim. If the measured DC voltage Vdcfbk is equal to or less than the discharge limiter operating voltage value VdclimL, the limiter 142 outputs the discharge limiter operating voltage value VdclimL as the limited measured DC voltage Vdclim.

The subtractor 144 calculates the deviation Vdcerr of the limited measured DC voltage Vdclim with respect to the measured DC voltage Vdcfbk. If the measured DC voltage Vdcfbk is equal to or higher than the charge limiter operating voltage value VdclimH, the deviation Vdcerr is a deviation between the charge limiter operating voltage value VdclimH and the measured DC voltage Vdcfbk. The deviation Vdcerr in this case is a positive value. When the measured DC voltage Vdcfbk is equal to or lower than the discharge limiter operating voltage value VdclimL, the deviation Vdcerr is a deviation between the discharge limiter operating voltage value VdclimL and the measured DC voltage Vdcfbk. In this case, the deviation Vdcerr is a negative value. When the measured DC voltage Vdcfbk is higher than the discharge limiter operating voltage value VdclimL and lower than the charge limiter operating voltage value VdclimH, the deviation Vdcerr becomes 0.

As a specific example, the charge limiter operating voltage value VdclimH is 1090V, and the discharge limiter operating voltage value VdclimL is 720V. An example of the measured DC voltage Vdcfbk during charging is 1150V, and an example of the measured DC voltage Vdcfbk during discharging is 716V. In this case, the limited measured DC voltage Vdclim output from the limiter 142 during charging is 1090V, and the deviation Vdcerr output from the subtractor 144 is -60V. Further, the limited measured DC voltage Vdclim output from the limiter 142 during discharging is 720V, and the deviation Vdcerr output from the subtractor 144 is 4V.

The PI controller 150 of the first specific example is the PI controller 152. The PI controller 152 calculates a PI control value G corresponding to the deviation Vdcerr calculated by the subtractor 144. The PI controller 152 switches between the configuration for charging control and the configuration for discharging control shown in FIG. 3. Therefore, the PI control value G output from the PI controller 152 during charging is the PI control value G2 for charge limitation. The PI control value G output from the PI controller 152 during discharging is the PI control value G1 for discharge limitation.

However, in the first specific example, an equation for obtaining the PI control value G2 for charge limitation is expressed by the following equation (11). The dimension of the PI control value G2 in the first specific example is a percentage. According to the equation (11), if the deviation Vdcerr is -60V as in the example during charging described above, the PI control value G2 for charge limitation is -600%.

[Equation 11]

$$G2(s) = K2 * Y(s) \quad (11)$$

In the first specific example, an equation for obtaining the PI control value G1 for discharge limitation is expressed by the following equation (12). The dimension of the PI control value G1 in the first specific example is a percentage. According to Equation (12), if the deviation Vdcerr is 4V as in the example during discharging described above, the PI control value G1 for discharge limitation is 40%.

[Equation 12]

$$G1(s) = K1 * Y(s) \quad (12)$$

In the first specific example, the limiter regulator 160 includes a discharge limitation gain regulation circuit including a limiter 162 and a subtractor 164, and a charge limitation gain regulation circuit including a limiter 166 and a subtractor 168. The discharge limitation gain regulation circuit is a circuit that regulates the upper limit value PreflimH of the variable limiter 122 within a range from 100% to 0%. The charge limitation gain regulation circuit is a circuit that regulates the lower limit value PreflimL of the variable limiter 122 within a range of −100% to 0%. The discharge limitation gain regulation circuit and the charge limitation gain regulation circuit are connected in parallel to the PI controller 152.

The limiter 162 constituting the discharge limitation gain regulation circuit limits the PI control value G (the PI control value G1 for discharge limitation) calculated by the PI controller 152 during discharging within a range of 100% to 0%, and outputs the limited PI control value GH. That is, if the PI control value G is equal to or less than 100%, the limiter 162 outputs the PI control value G as it is as the limited PI control value GH. If the PI control value G is higher than 100%, the limiter 162 outputs 100% as the limited PI control value GH. The subtractor 164 constituting the discharge limitation gain regulation circuit subtracts the limited PI control value GH from 100%, which is a fixed value, and outputs the deviation as a discharge limitation gain. The discharge limitation gain is set as the upper limit value PreflimH of the variable limiter 122.

When the PI control value G is 40% as in the example during discharging described above, the limited PI control value GH is 40% as it is, and the upper limit value PreflimH is set to 60%. As a result, the power command value Pref for commanding discharging is limited to 60% in the variable limiter 122, and the power command value Pref2 limited to 50% is input to the drive signal generator 110.

The limiter 166 constituting the charge limitation gain regulation circuit limits the PI control value G (the PI control value G2 for charge limitation) calculated by the PI controller 152 during charging within a range of −00% to 0%, and outputs the limited PI control value GL. In other words, if the PI control value G is equal to or larger than −100%, the limiter 166 outputs the PI control value G as it is as the limited PI control value GL. If the PI control value G is lower than −100%, the limiter 166 outputs −100% as the limited PI control value GL. The subtractor 168 constituting the charge limitation gain regulation circuit subtracts the limited PI control value GL from −100%, which is a fixed value, and outputs the deviation as a charge limitation gain. The charge limitation gain is set as the lower limit value PreflimL of the variable limiter 122.

When the PI control value G is −600% as in the example during charging described above, the limited PI control value GL is −100%, and the lower limit value PreflimL is set to 0%. As a result, the power command value Pref for commanding charging is limited to 0% by the variable limiter 122, and the power command value Pref2 limited to 0% is input to the drive signal generator 110.

SECOND SPECIFIC EXAMPLE

Figure 9:
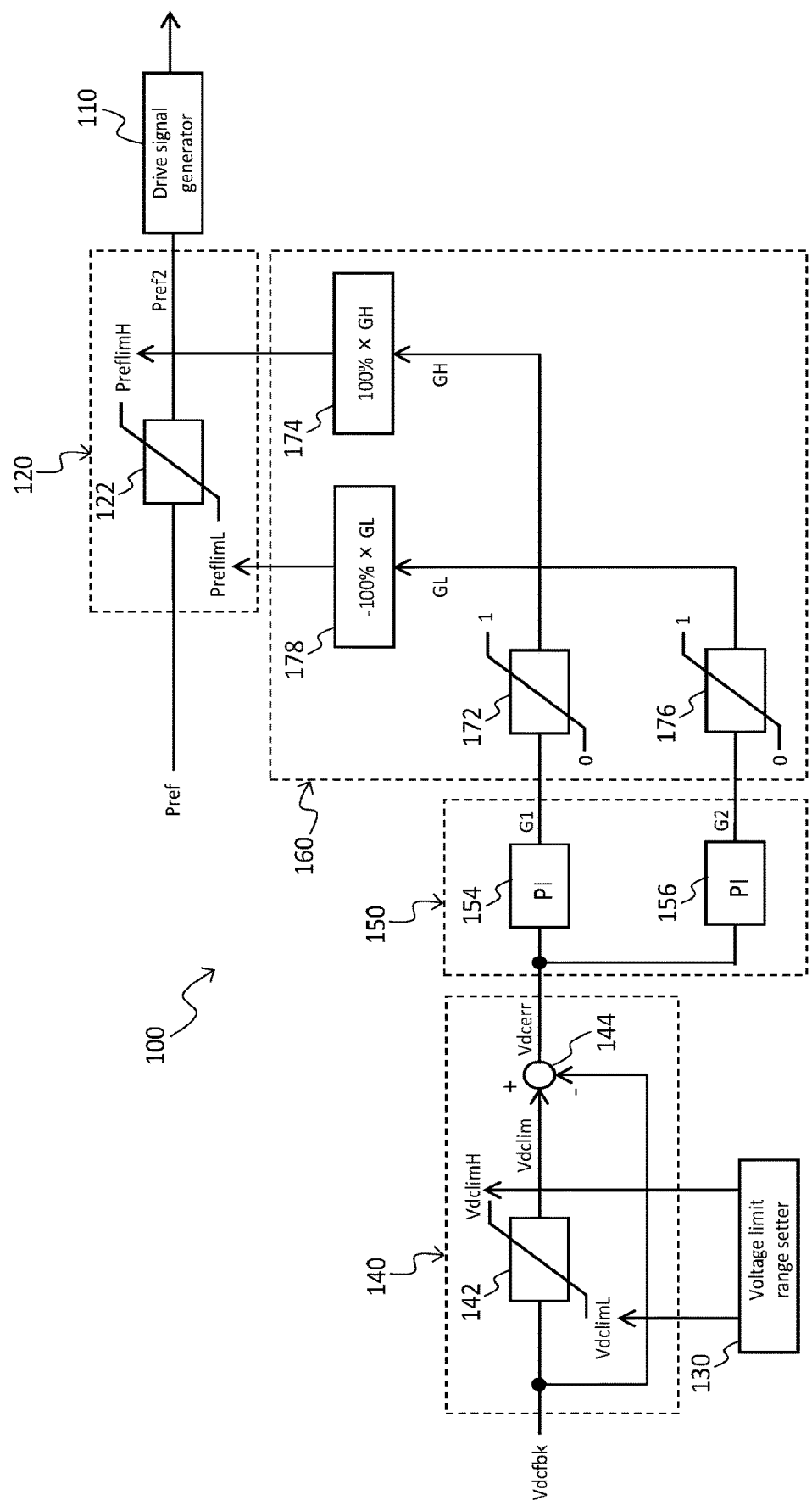
FIG. 9 is a diagram illustrating a second specific example of the configuration of the controller for the power conditioner according to the embodiment of the present disclosure.

FIG. 9 is a diagram illustrating a second specific example of the configuration of the controller 100. In the second specific example, the command value limiter 120 includes the variable limiter 122 as in the first specific example. The variable limiter 122 outputs the power command value Pref2 obtained by limiting the power command value Pref by the upper limit value PreflimH or the lower limit value PreflimL.

In the second specific example, similarly to the first specific example, the voltage deviation calculator 140 includes the limiter 142 and the subtractor 144. If the measured DC voltage Vdcfbk is equal to or higher than the charge limiter operating voltage value VdclimH, the deviation Vdcerr between the charge limiter operating voltage value VdclimH and the measured DC voltage Vdcfbk is output from the subtractor 144. When the measured DC voltage Vdcfbk is equal to or lower than the discharge limiter operating voltage value VdclimL, the deviation Vdcerr between the discharge limiter operating voltage value VdclimL and the measured DC voltage Vdcfbk is output from the subtractor 144.

In the second specific example, the PI controller 150 includes a PI controller 154 for discharging control and a PI controller 156 for charging control. The PI controller 154 and the PI controller 156 are connected in parallel to the subtractor 144.

The PI controller 154 for discharging control has a configuration shown in the lower part of FIG. 3. The PI control value G1 for discharge limitation output from the PI controller 154 is calculated according to the above-described equation (10). Assuming that the system lower limit voltage Vdcmin is 710V and the discharge limiter operating voltage value VdclimL is 720V, if the deviation Vdcerr is 4V as in the example during discharging described above, the PI control value G1 for discharge limitation is 0.6.

The PI controller 156 for charging control has the configuration shown in the upper part of FIG. 3. The PI control value G2 for charge limitation output from the PI controller 156 is calculated in accordance with the above-described equation (9). Assuming that system upper limit voltage Vdcmax is 1100V and the charge limiter operating voltage value VdclimH is 1090V, if the deviation Vdcerr is −60V as in the example during charging described above, the PI control value G2 for charge limitation is −5.

In the second specific example, the limiter regulator 160 includes a discharge limitation gain regulation circuit including a limiter 172 and a multiplier 174, and a charge limitation gain regulation circuit including a limiter 176 and a multiplier 178. The discharge limitation gain regulation circuit is a circuit that regulates the upper limit value PreflimH of the variable limiter 122 within a range from 100% to 0%. The charge limitation gain regulation circuit is a circuit that regulates the lower limit value PreflimL of the variable limiter 122 within a range from −100% to 0%.

The limiter 172 constituting the discharge limitation gain regulation circuit limits the PI control value G1 for discharge limitation calculated by the PI controller 154 within a range of 1 to 0, and outputs the limited PI control value GH. When the command from the host device 4 is a discharge command, the PI control value G1 takes a value of 1 or less. When the PI control value G2 is equal to or larger than 0 and equal to or lower than 1, the limiter 172 outputs the PI control value G1 as it is as the limited PI control value GH. If the PI control value G1 is lower than 0, the limiter 172 outputs 0 as the limited PI control value GH. The multiplier 174 constituting the discharge limitation gain regulation circuit multiplies the limited PI control value GH by 100%, which is a fixed value, and outputs the product as a discharge limitation gain. The discharge limitation gain is set as the upper limit value PreflimH of the variable limiter 122.

When the PI control value G1 is 0.6 as in the example during discharging described above, the limited PI control value GH is 0.6 and the upper limit value PreflimH is set to 60%. As a result, the power command value Pref for commanding discharge is limited to 60% in the variable limiter 122, and the power command value Pref2 limited to 60% is input to the drive signal generator 110.

The limiter 176 constituting the charge limitation gain regulation circuit limits the PI control value G2 for charge limitation calculated by the PI controller 156 within a range of 1 to 0, and outputs the limited PI control value GL. When the command from the host device 4 is a charging command, the PI control value G2 takes a value of 1 or less. When the PI control value G2 is equal to or larger than 0 and equal to or less than 1, the limiter 176 outputs the PI control value G2 as it is as the limited PI control value GL. If the PI control value G2 is lower than 0, the limiter 176 outputs 0 as the limited PI control value GL. The multiplier 178 constituting the charge limitation gain regulation circuit multiplies the limited PI control value GL by −100%, which is a fixed value, and outputs the product as a charge limitation gain. The charge limitation gain is set as the lower limit value PreflimL of the variable limiter 122.

When the PI control value G1 is −5 as in the example during charging described above, the limited PI control value GL is 0, and the lower limit value PreflimL is set to 0%. As a result, the power command value Pref for commanding charging is limited to 0% by the variable limiter 122, and the power command value Pref2 limited to 0% is input to the drive signal generator 110.

THIRD SPECIFIC EXAMPLE

Figure 10:
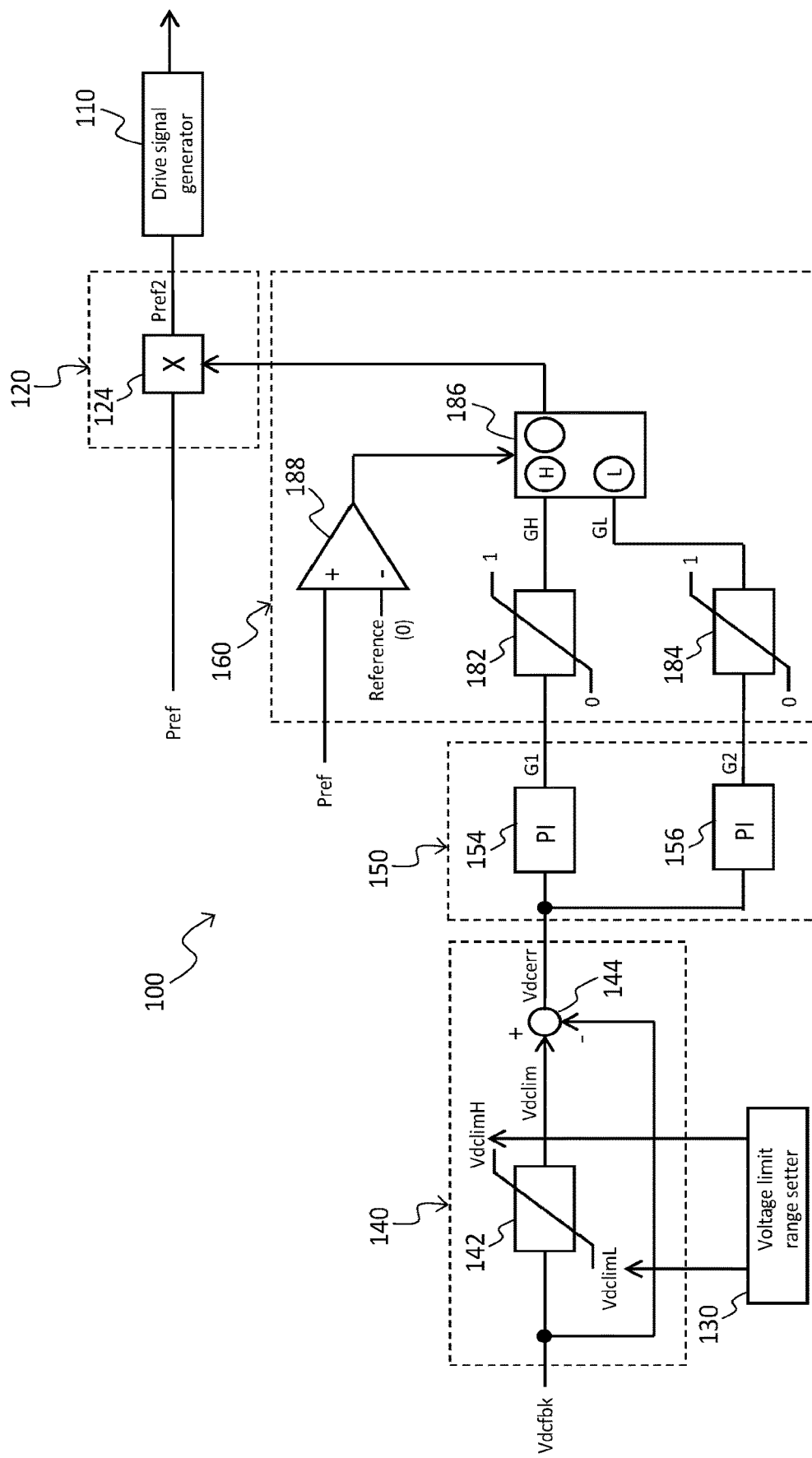
FIG. 10 is a diagram showing a third specific example of the configuration of the controller of the power conditioner according to the embodiment of the present disclosure.

FIG. 10 is a diagram illustrating a third specific example of the configuration of the controller 100. In the third specific example, the command value limiter 120 includes a gain multiplier 124. The gain multiplier 124 multiplies the power command value Pref by a gain. The positive power command value Pref, i.e., the discharging power command value is multiplied by a discharge limitation gain within a range from 1 to 0. The negative power command value Pref, i.e., the charging power command value is multiplied by a charge limitation gain within a range from 1 to 0. The gain multiplier 124 outputs the power command value Pref multiplied by the discharge limitation gain or the charge limitation gain as the limited power command value Pref2.

In the third specific example, as in the first and second specific examples, the voltage deviation calculator 140 includes the limiter 142 and the subtractor 144. If the measured DC voltage Vdcfbk is equal to or higher than the charge limiter operating voltage value VdclimH, the deviation Vdcerr between the charge limiter operating voltage value VdclimH and the measured DC voltage Vdcfbk is output from the subtractor 144. When the measured DC voltage Vdcfbk is equal to or lower than the discharge limiter operating voltage value VdclimL, the deviation Vdcerr between the discharge limiter operating voltage value VdclimL and the measured DC voltage Vdcfbk is output from the subtractor 144.

In the third specific example, similarly to the second specific example, the PI controller 150 includes the PI controller 154 for discharging control and the PI controller 156 for charge limitation. The PI controller 154 for discharging control has the configuration shown in the lower part of FIG. 3, and outputs the PI control value G1 for discharge limitation. The PI controller 156 for charging control has the configuration shown in the upper part of FIG. 3, and outputs the PI control value G2 for charge limitation.

In the third specific example, the limiter regulator 160 includes a limiter 182 for setting the discharge limitation gain, a limiter 184 for setting the charge limitation gain, a gain switch 186, and a switching determiner 188. The limiter regulator 160 is a circuit that regulates the discharge limitation gain and the charge limitation gain to be multiplied by the power command value Pref in the gain multiplier 124 within a range from 1 to 0.

The limiter 182 for setting the discharge limitation gain limits the PI control value G1 for discharge limitation calculated by the PI controller 154 within a range of 1 to 0, and outputs the limited PI control value as the discharge limitation gain GH. When the command from the host device 4 is a discharge command, the PI control value G1 takes a value of 1 or less. When the PI control value G1 is equal to or larger than 0 and equal to or less than 1, the limiter 182 outputs the PI control value G1 as it is as the discharge limitation gain GH. When the PI control value G1 is lower than 0, the limiter 182 outputs 0 as the limited discharge limitation gain GH.

The limiter 182 for setting the discharge limitation gain limits the PI control value G2 for charge limitation calculated by the PI controller 156 within a range of 1 to 0, and outputs the limited PI control value as the charge limitation gain GL. When the command from the host device 4 is a charging command, the PI control value G2 takes a value of 1 or less. When the PI control value G2 is equal to or larger than 0 and equal to or less than 1, the limiter 184 outputs the PI control value G2 as it is as the charge limitation gain GL. When the PI control value G2 is lower than 0, the limiter 184 outputs 0 as the limited charge limitation gain GL.

The discharge limitation gain GH output from the limiter 182 and the charge limitation gain GL output from the limiter 184 are both input to the gain switch 186. The gain switch 186 switches the gain to be selected between the discharge limitation gain GH and the charge limitation gain GL in response to the trigger signal input from the switching determiner 188. The gain selected by the gain switch 186 is input to the gain multiplier 124 and is multiplied by the power command value Pref as the discharge limitation gain or the charge limitation gain.

The switching determiner 188 compares the power command value Pref with a reference value of 0, and inputs a trigger signal based on the comparison result to the gain switch 186. When the power command value Pref becomes equal to or higher than 0, the switching determiner 188 inputs the trigger signal to the gain switch 186 so that the discharge limitation gain GH input from the limiter 182 is selected. When power command value Pref becomes 0, the switching determiner 188 inputs the trigger signal to the gain switch 186 so that the charge limitation gain GL input from the limiter 184 is selected.

Since the power command value Pref is a positive value during discharging, the discharge limitation gain GH input from the limiter 182 is selected in the gain switch 186. Thus, the discharge limitation gain GH is input to the gain multiplier 124. When the PI control value G1 calculated by the PI controller 154 is 0.6 as in the example during discharging described above, the discharge limitation gain GH is 0.6, and the gain multiplier 124 multiplies the power command value Pref by 0.5. As a result, the power command value Pref2 whose ratio with respect to the power command value Pref is limited to 0.6 is input to the drive signal generator 110.

Since the power command value Pref is a negative value during charging, the charge limitation gain GL input from the limiter 184 is selected in the gain switch 186. As a result, the charge limitation gain GL is input to the gain multiplier 124. When the PI control value G2 calculated by the PI controller 156 is −5 as in the example during charging described above, the charge limitation gain GL is 0, and the gain multiplier 124 multiplies the power command value Pref by 0. As a result, the power command value Pref2 whose ratio with respect to the power command value Pref is limited to 0 is input to the drive signal generator 110.

4. Effect

As described above, according to the PCS 10 of the present embodiment, overcharge and over-discharge of the storage battery 6 are prevented with a simple configuration as shown in the first to third specific examples. In addition, the PCS 10 according to the present embodiment is implemented by changing only the software of the controller without changing the hardware from the conventional PCS.

According to the PCS 10 of the present embodiment, the limitation on the charging power command value by the command value limiter 120 is strengthened in accordance with the PI control value for the deviation between the measured DC voltage and the charge limiter operating voltage. As a result, the chattering of the command value limiter 120 caused by the voltage fluctuation can be suppressed, and the charging operation can be continued as long as possible. Further, according to the PCS 10 of the present embodiment, the limitation on the discharging power command value by the command value limiter 120 is strengthened in accordance with the PI control value for the deviation between the measured DC voltage and the discharge limiter operating voltage. As a result, the chattering of the command value limiter 120 caused by the voltage fluctuation can be suppressed, and the discharging operation can be continued as long as possible.

DESCRIPTION OF SYMBOLS

2 Power conversion system
4 Host device
6 Storage battery
10 Power conditioner
20 Inverter circuit
80 Voltmeter
100 Controller
110 Drive signal generator
120 Command value limiter
130 Voltage limit range setter
140 Voltage deviation calculator
150 PI controller
160 Limiter regulator

The invention claimed is:

1. A power conditioner comprising:
an inverter circuit that connects an AC power system and a storage battery;
a command value limiter configured to limit a charging power command value commanded by a host device and a discharging power command value commanded by the host device;
a drive signal generator configured to generate a drive signal for the inverter circuit in accordance with the charging power command value limited by the command value limiter or the discharging power command value limited by the command value limiter;
a PI controller configured to calculate a PI control value for charge limitation, which is a PI control value for a deviation between a DC voltage applied to the inverter circuit and a preset charge limiter operating voltage, in response to the DC voltage being higher than the charge limiter operating voltage, and calculate a PI control value for discharge limitation, which is a PI control value for a deviation between the DC voltage and a preset discharge limiter operating voltage, in response to the DC voltage being lower than the discharge limiter operating voltage; and
a limiter regulator configured to increase a limitation on the charging power command value by the command value limiter in accordance with the PI control value for charge limitation and increase a limitation on the discharging power command value by the command value limiter in accordance with the PI control value for discharge limitation.

2. The power conditioner according to claim 1, wherein the command value limiter is configured to multiply the charging power command value by a charge limitation gain having a value of 0 or more and 1 or less, and multiply the discharging power command value by a discharge limitation gain having a value of 0 or more and 1 or less, and
the limiter regulator is configured to decrease the charge limitation gain in accordance with the PI control value for charge limitation and decrease the discharge limitation gain in accordance with the PI control value for discharge limitation.

3. The power conditioner according to claim 2, wherein the limiter regulator is configured to maintain the charge limitation gain at 0 while the PI control value for charge limitation is out of a preset range and maintain the discharge limitation gain at 0 while the PI control value for discharge limitation is out of a preset range.

4. A power conversion system comprising:
one or more power conditioners connected to a common AC power system; and
a host device configured to command a charging power command value or a discharging power command value to the one or more power conditioners,
wherein each of the one or more power conditioners is the power conditioner according to claim 1.

5. A power conversion system comprising:
one or more power conditioners connected to a common AC power system; and
a host device configured to command a charging power command value or a discharging power command value to the one or more power conditioners,
wherein each of the one or more power conditioners is the power conditioner according to claim 2.

6. A power conversion system comprising:
one or more power conditioners connected to a common AC power system; and
a host device configured to command a charging power command value or a discharging power command value to the one or more power conditioners,
wherein each of the one or more power conditioners is the power conditioner according to claim 3.

7. A power conditioner comprising:
an inverter circuit that connects an AC power system and a storage battery;
a command value limiter configured to limit a charging power command value commanded by a host device;
a drive signal generator configured to generate a drive signal for the inverter circuit in accordance with the charging power command value limited by the command value limiter;
a PI controller configured to calculate a PI control value for a deviation between a DC voltage applied to the inverter circuit and a preset charge limiter operating voltage, in response to the DC voltage being higher than the charge limiter operating voltage; and a limiter regulator configured to increase a limitation on the charging power command value by the command value limiter in accordance with the PI control value.

8. The power conditioner according to claim 7, wherein the command value limiter is configured to multiply the charging power command value by a charge limitation gain having a value of 0 or more and 1 or less, and the limiter regulator is configured to decrease the charge limitation gain in accordance with the PI control value.

9. The power conditioner according to claim 8, wherein the limiter regulator is configured to maintain the charge limitation gain at 0 while the PI control value is out of a preset range.

10. A power conversion system comprising:
one or more power conditioners connected to a common AC power system; and
a host device configured to command a charging power command value or a discharging power command value to the one or more power conditioners,
wherein each of the one or more power conditioners is the power conditioner according to claim 7.

11. A power conversion system comprising:
one or more power conditioners connected to a common AC power system; and
a host device configured to command a charging power command value or a discharging power command value to the one or more power conditioners,
wherein each of the one or more power conditioners is the power conditioner according to claim 8.

12. A power conversion system comprising:
one or more power conditioners connected to a common AC power system; and
a host device configured to command a charging power command value or a discharging power command value to the one or more power conditioners,
wherein each of the one or more power conditioners is the power conditioner according to claim 9.

13. A power conditioner comprising:
an inverter circuit that connects an AC power system and a storage battery;
a command value limiter configured to limit a discharging power command value commanded by a host device;
a drive signal generator configured to generate a drive signal for the inverter circuit in accordance with the discharging power command value limited by the command value limiter;

a PI controller configured to calculate a PI control value for a deviation between a DC voltage applied to the inverter circuit and a preset discharge limiter operating voltage, in response to the DC voltage being lower than the discharge limiter operating voltage; and a limiter regulator configured to increase a limitation on the discharging power command value by the command value limiter in accordance with the PI control value.

14. The power conditioner according to claim 13, wherein the command value limiter is configured to multiply the discharging power command value by a discharge limitation gain having a value of 0 or more and 1 or less, and the limiter regulator is configured to decrease the discharge limitation gain in accordance with the PI control value.

15. The power conditioner according to claim 14, wherein the limiter regulator is configured to maintain the discharge limitation gain at 0 while the PI control value is out of a preset range.

16. A power conversion system comprising:
one or more power conditioners connected to a common AC power system; and
a host device configured to command a charging power command value or a discharging power command value to the one or more power conditioners,
wherein each of the one or more power conditioners is the power conditioner according to claim 13.

17. A power conversion system comprising:
one or more power conditioners connected to a common AC power system; and
a host device configured to command a charging power command value or a discharging power command value to the one or more power conditioners,
wherein each of the one or more power conditioners is the power conditioner according to claim 14.

18. A power conversion system comprising:
one or more power conditioners connected to a common AC power system; and
a host device configured to command a charging power command value or a discharging power command value to the one or more power conditioners,
wherein each of the one or more power conditioners is the power conditioner according to claim 15.

* * * * *